3,594,371
PREPARATION OF 7-AMINOCEPHALOSPORANIC ACID
Thomas W. McIntyre, Indianapolis, Ind., assignor to Eli Lilly and Company, Indianapolis, Ind.
No Drawing. Continuation-in-part of applications Ser. No. 738,084, and Ser. No. 738,085, both June 19, 1968. This application May 15, 1969, Ser. No. 825,028
Int. Cl. C07d 99/24
U.S. Cl. 260—243                              13 Claims

ABSTRACT OF THE DISCLOSURE 7-aminocephalosporanic acid (7-ACA) of high purity is obtained by treating cephalosporin C with a nitrosating agent such as nitrosyl chloride followed by treatment of the reaction mixture with a lower alkylene oxide.

CROSS-REFERENCES

This application is a continuation-in-part of my copending applications Ser. Nos. 738,084 and 738,085 filed June 19, 1968, both now abandoned.

BACKGROUND OF THE INVENTION

Cephalosporin C is obtained by fermentation as described in British patent specification 810,196, published Mar. 11, 1959. Cephalosporin C has a low order of biological activity, and it has been found necessary to chemically convert cephalosporin C into derivatives such as cephalothin and cephaloglycin in order to obtain active antibiotics. One step in this chemical modification involves cleavage of the amido group in the 7-position of the cephalosporin nucleus to obtain 7-ACA.

A commercially significant process for the cleavage of the 7-amido group of cephalosporin C was first described by Morin et al. in U.S. Pat. 3,188,311. In accordance with the Morin process cephalosporin C is treated with a reagent such as nitrosyl chloride to prepare a cyclic intermediate which is then subjected to hydrolytic cleavage to yield 7-ACA. In Eardley et al. U.S. Pat. 3,367,933 there is described an improvement on the Morin et al. process wherein the cephalosporin C is treated with nitrosyl chloride in a mixed solvent system, the intermediate is then treated with methanol, and the 7-ACA is precipitated from the methanol solution by the addition of ammonium hydroxide.

Both the Morin et al. process and the Eardley et al. improvement thereon result in the production of a 7-ACA containing impurities which interfere with the subsequent N-acylation that is necessary to obtain biologically active compounds. Therefore, 7-ACA prepared by either of these processes must be subjected to a purification procedure prior to acylation. One such purification procedure involves the formation of an acid addition salt of 7-ACA with a hydrocarbyl sulfonic acid or nitric acid. Such purification procedures result in losses of 7-ACA and increase the cost of the biologically active derivatives. The advantages to be realized by the elimination of the purification step are apparent.

SUMMARY

I have now discovered a process for the preparation of 7-ACA which yields a product whose purity is such that no further purification is necessary. In accordance with my process cephalosporin C or a salt thereof is treated with a nitrosating agent, a carbocyclic arenediazonium salt, or a substance affording a positive halogen, at a temperature of less than about 60° C. the reaction mixture is treated with a lower alkylene oxide containing two to four carbon atoms. This can be done by first treating with water, a lower alkanol containing one to three carbon atoms, or mixtures thereof, and then adding a lower alkylene oxide to precipitate the 7-ACA. Alternatively, the reaction solvent can be removed by evaporation and the residue treated with the alkylene oxide. The 7-ACA from my process is sufficiently pure that it can be acylated to obtain biologically active compounds of high quality in good view. Thus, by my process I have succeeded in eliminating the costly purification step.

DESCRIPTION OF THE PREFERRED EMBODIMENT

The first step in my process comprises treating cephalosporin C or a salt thereof with a nitrosating agent, a carbocyclic arenediazonium salt, or a substance affording positive halogen, at a temperature of less than about 60° C. Cephalosporin C is 7-(5'-amino-N'-adipamyl)-cephalosporanic acid. It can be obtained by fermentation as described in British patent specification 810,196. Cephalosporin C may be employed in the form of a free acid or as a salt thereof. Suitable salts include metallic salts such as the sodium, potassium, and lithium salts, and ammonium and substituted ammonium salts.

Suitable reagents for reacting with the cephalosporin C include the following: (1) nitrosating agents, such as nitrosyl chloride, nitrosyl bromide, nitrous acid, nitrogen dioxide, nitrogen tetroxide, nitrogen trioxide, alkyl nitrites, N-nitroso-3-nitrocarbazole, nitrosylsulfuric acid, nitrosyl fluoborate, nitrosyl hexafluorophosphate, and the like; (2) substances affording positive halogen under the reaction conditions, such as N-bromosuccinimide, N-chlorosuccinimide, N-bromophthalimide, N-chlorophthalimide, N-bromoacetamide, and the like; and (3) arenediazonium salts such as benzenediazonium chloride, naphthalenediazonium chloride, and the like. The preferred reagent for my process is nitrosyl chloride.

The molar ratio of reagent to cephalosporin C should be at least 1 and is preferably from about 1.5 to about 3. The use of a larger excess is not recommended since any unreacted reagent should be destroyed or removed at the completion of the reaction.

The reaction may be run at temperatures below about 60° C. It is preferred to operate at temperatures below about 20° C., and still more preferable to operate at about 0° C., for example, from about −10° to about +5° C.

Solvents for the reaction are described in U.S. Pats. 3,188,311 and 3,367,933. The choice of solvent will affect the yield of 7-ACA but will not substantially affect the purity of the product obtained. In order to obtain optimum yields it is preferred to use a mixed solvent system of formic acid with either nitromethane, acetonitrile, or a mixture of nitromethane and 2-nitropropane.

The reaction proceeds rapidly at the temperatures specified and is complete within a matter of minutes after addition of the treating reagent is complete. Thus, for example, reaction times on the order of 5 to 15 minutes are sufficient. If temperatures of less than about −10° C. are employed, the reaction proceeds more slowly and longer reaction times are needed.

In one embodiment of my process the reaction intermediate is treated with water or a lower alkanol containing one to three carbon atoms such as, for example, methanol, ethanol, or propanol. Mixtures may also be used. Methanol is preferred. This treatment may be effected by first removing the solvent by evaporation, preferably at reduced pressure, and adding the water or lower-alkanol to the residue. If this procedure is followed, sufficient water or alcohol is added to dissolve the residue. Alternatively, a large volume of alcohol may be mixed with the reaction mixture without evaporation of the solvent. In either event there is obtained a solution of 7-ACA in essentially water or an alcohol.

If the solvent is removed prior to treating with water or an alcohol, it is preferred to use an additive to react with excess cleavage reagent prior to solvent evaporation. If the reaction mixture is mixed with a large volume of alcohol, the alkylene oxide may be present in the alcohol at the time of mixing, or the alkylene oxide may be added later. I have observed no essential differences in the results obtained by the two procedures.

Heretofore, the 7-ACA has been precipitated from solution by the addition of a base such as sodium hydroxide, potassium hydroxide, or ammonium hydroxide to a pH of about 3.5. This procedure results in the precipitation of impurities with the 7-ACA so that it is necessary to purify the 7-ACA before it can be used in the preparation of biologically-active derivatives.

In accordance with my process a lower alkylene oxide containing two to four carbon atoms is added to precipitate the 7-ACA. Examples of suitable alkylene oxides include ethylene oxide, 1,2-propylene oxide, butene-1 oxide, butene-2 oxide and oxirane. In addition, I have found that $\beta$-propiolactone may also be used in my process. This is not surprising since $\beta$-propiolactone may be considered to be oxirane-2-one. Ethylene oxide and 1,2-propylene oxide are preferred for use in my process.

Although the mechanism of precipitation with the alkylene oxide has not been definitely established, it appears that the addition of the oxide induces a slow crystallization of 7-ACA. This is in contrast to the direct neutralization of soluble 7-ACA salts and rapid precipitation that occurs upon the addition of a base. When rapid precipitation occurs there is a tendency for dissolved substances to be trapped within the precipitate and to come down with it, thus causing contamination of the precipitate. On the other hand, when slow crystallization and precipitation occur trapped particles have a greater opportunity to escape so there is less chance for contamination.

The amount of alkylene oxide necessary to bring about complete precipitation will depend upon the oxide chosen and the concentration and composition of the solution of 7-ACA. The proper amount of oxide can be determined on a trial and error basis with a minimum of experimentation. In general, I have found that I get good results if I use from about 3 to about 30 moles of oxide per mole of starting cephalosporin compound. I have found that it is better to add the oxide rapidly all at once rather than slowly over a period of time.

I have also found it to be advantageous to add a small amount of water a few minutes after the oxide addition in those cases where an alcohol is used to treat the intermediate. Such a procedure results in a purer product. An optimum amount of water appears to be approximately an equal amount, by volume, to the oxide added. More or less than this can also be used.

In a particularly preferred embodiment of my process a solution of cephalosporin C sodium salt monohydrate in a mixture of formic acid and acetonitrile is treated with from 2 to 2.5 moles of nitrosyl chloride at a temperature of from $-10°$ to $+5°$ C. At the completion of the reaction the mixture is poured into a large volume of methanol, and propylene oxide is then added to precipitate the 7-ACA.

The first embodiment of my process will be further illustrated by the following examples.

EXAMPLE 1

To a solution of 168 g. of cephalosporin C sodium salt monohydrate in 420 ml. of formic acid was added 1 l. of a 1:1 by volume mixture of nitromethane and 2-nitropropane. The solution was cooled to $-8°$ C. and a solution of 39 ml. of nitrosyl chloride in 240 ml. of the nitroalkane mixture was added over 7 minutes. This mixture was stirred at $0°$ C. for an additional 13 minutes and then poured into 5.4 l. of methanol. After stirring the methanol solution for 3 minutes, 250 ml. of propylene oxide was added to precipitate the 7-ACA and the temperature was maintained at $10°$ C. for 1 hour. The product was collected by filtration, washed with methanol and dried at $42°$ C. in a vacuum oven. The 7-ACA was obtained in 49.8 percent yield and had a purity of 94.2 percent as determined by ultraviolet spectroscopy.

EXAMPLES 2–15

A series of cleavage runs was made wherein 28 g. of cephalosporin C sodium salt monohydrate was treated with 6.5 ml. of nitrosyl chloride as in Example 1 in a solvent consisting of formic acid and a diluent. The 7-ACA was recovered by mixing the reaction mixture with a large volume of methanol or ethanol as in Example 1. The results are found in Table 1. In the table, the symbol R—$NO_2$ represents the nitroalkane mixture used in Example 1. In Examples 2–4 and 6–11 the alkylene oxide was present in the alcohol at the time of addition of the reaction mixture. In Examples 5 and 12–15 the alkylene oxide was added about 3 minutes after the reaction mixture was added to the alcohol. The temperature shown is the temperature at which the mixture was held after addition of alkylene oxide and prior to filtration. Only 14 g. of cephalosporin C was used in Example 14. In Examples 12–14 the water shown in the table was added after the oxide.

TABLE 1

| Example | $HCO_2H$, Ml. | Diluent | Ml. | Alcohol | Ml. | Alkylene oxide | Ml. | Temperature, °C. | Purity, percent |
|---|---|---|---|---|---|---|---|---|---|
| 2 | 70 | R—$NO_2$ | 210 | $CH_3OH$ | 900 | Propylene oxide | 20 | 20 | 90.5 |
| 3 | 70 | R—$NO_2$ | 210 | $CH_3OH$ | 900 | do | 40 | 20 | 91.5 |
| 4 | 70 | R—$NO_2$ | 210 | $CH_3OH$ | 900 | do | 100 | 20 | 90.0 |
| 5 | 70 | R—$NO_2$ | 210 | $CH_3OH$ | 900 | do | 40 | 20 | 92.4 |
| 6 | 70 | R—$NO_2$ | 210 | $CH_3OH$ | 500 | do | 100 | 20 | 90.8 |
| 7 | 70 | R—$NO_2$ | 210 | $CH_3OH$ | 500 | $\beta$-Propiolactone | 100 | 20 | 89.8 |
| 8 | 70 | R—$NO_2$ | 210 | $CH_3OH$ | 900 | Ethylene oxide | 20 | 4 | 93.2 |
| 9 | 70 | R—$NO_2$ | 210 | $CH_3OH$ | 900 | do | 40 | 6 | 95.0 |
| 10 | 70 | R—$NO_2$ | 210 | $CH_3OH$ | 900 | do | 60 | 10 | 92.0 |
| 11 | 70 | R—$NO_2$ | 210 | $CH_3OH$ | 600 | $\beta$-Propiolactone | 60 | 37 | 94.4 |
| 12 | 70 | R—$NO_2$ | 210 | $CH_3OH$ | 900 | Propylene oxide / $H_2O$ | 50 / 50 | 20 | 95.3 |
| 13 | 80 | $CH_3CN$ | 200 | $CH_3OH$ | 900 | Propylene oxide / $H_2O$ | 50 / 50 | 20 | 93.1 |
| 14 | 50 | $CH_3CN$ | 100 | $C_2H_5OH$ | 450 | Propylene oxide / $H_2O$ | 25 / 25 | 10 | 92.4 |
| 15 | 100 | $CH_3CN$ | 200 | $CH_3OH$ | 900 | 2,2-dimethoxypropane / Propylene oxide | 200 / 50 | 20 | 91.6 |

EXAMPLE 16

A 28 g. sample of cephalosporin C sodium salt monohydrate was treated with 6.5 ml. of nitrosyl chloride as described in Example 1 using 100 ml. of formic acid and 200 ml. of acetonitrile as solvent. At the completion of the reaction the solvent was evaporated at reduced pressure and the residue was taken up in 200 ml. of ice water. To this solution was added 50 ml. of propylene oxide and the mixture was allowed to stand at $12°$ C. The product was recovered by filtration, washed with water, and dried. The purity was 99.0 percent.

In another embodiment of my process, upon completion of the cleavage reaction the solvent is removed by evaporation, preferably under reduced pressure, to leave a residue which is then treated with a lower alkylene oxide. In a particularly preferred embodiment of my process an additive which reacts with excess cleavage reagent is employed prior to the evaporation. The use of such an additive results in increased yields.

Heretofore, the residue from the evaporation has been dissolved in water or a lower alkanol and the 7-ACA recovered from this solution. In accordance with my process this residue is treated with a lower alkylene oxide containing two to four carbon atoms. No water or alcohol is necessary. Lower alkylene oxides that may be employed include, for example, ethylene oxide, 1,2-propylene oxide, butene-2 oxide, butene-1 oxide, and oxirane. Ethylene oxide and 1,2-propylene oxide are preferred.

Treatment of the residue with an alkylene oxide may be effected by the direct addition of the oxide to the residue. However, it is preferred to use an inert solvent for this step. Preferably, a solution of the oxide in the inert solvent is added to the residue. Alternatively, the residue may first be dissolved or dispersed in the solvent, followed by addition of the oxide to the mixture. In either case there is obtained a slurry of product 7-ACA in the solvent. This product may be collected by any suitable means such as filtration or centrifugation and dried.

The solvent to be used in this step should be inert and a poor solvent for 7-ACA. Preferred solvents are diluents for the cleavage reaction as described in U.S. Pat. 3,367,933. Acetonitrile is particularly preferred. Other acceptable solvents include esters such as ethyl acetate and n-butyl acetate, ketones such as acetone and methyl ethyl ketone, and ethers such as dioxane and tetrahydrofuran. Solvents in which 7-ACA is quite soluble, such as dimethylformamide and dimethylacetamide, are not well suited for use alone, but may be used advantageously in combination with a non-solvent for 7-ACA. When such combinations are used it is preferred to dissolve the residue in a small amount of the solvent, then add a non-solvent, such as n-butyl acetate, containing the oxide. The viscous residue is difficult to break up and disperse when a non-solvent is used alone. This problem is overcome by the use of a combination of a good solvent and a non-solvent.

The total function of the alkylene oxide is not clear; therefore, it is difficult to know how much oxide should be added. The proper amount of oxide can be determined on a trial and error basis with a minimum of experimentation. In general, I have found that good results are achieved using from about 3 to about 30 moles of oxide per mole of starting cephalosporin compound. This is not to imply that the function of the oxide is related in some way to the amount of cephalosporin compound being cleaved; it is merely a convenient way to express the amount of oxide used. I have also found that I get higher yields if the oxide is added rapidly all at once rather than added slowly over a period of time.

The 7-ACA obtained in this manner has a high purity except for certain water-soluble impurities that are present in the precipitate. These water-soluble impurities may be removed from the 7-ACA by a water wash after the 7-ACA has been thoroughly dried. In this way a high purity 7-ACA is obtained in good yield without the necessity of treating an intermediate with water or an alcohol or precipitation by the addition of a base. Many acylations of 7-ACA are conducted in an aqueous medium and the water-soluble impurities do not interfere in such case. Therefore, it is not always necessary to water-wash the product.

This embodiment of my process will be further illustrated by the following examples:

EXAMPLE 17

A solution of 56 grams of cephalosporin C sodium salt monohydrate in 200 ml. of formic acid and 280 ml. of acetonitrile was cooled to $-8°$ C. and 100 ml. of acetonitrile containing 12.6 ml. of nitrosyl chloride was added over four minutes. The reaction mixture was stirred at $0°$ C. for an additional 11 minutes and then 8 g. of ammonium sulfamate was added gradually with cooling to keep the reaction temperature below $4°$ C. The reaction mixture was concentrated to a gum under vacuum. This gum was slurried with 300 ml. of acetonitrile containing 80 ml. of propylene oxide. The slurry was allowed to stand for 15 minutes and the insoluble product was collected by filtration and washed with 200 ml. of acetonitrile. After drying in a vacuum oven at $42°$ C., 7-ACA was obtained in 43.2 percent yield. This yield figure is a corrected figure to allow for the purity of 54.5 percent of the 7-ACA obtained. The impurities in the sample were primarily water-soluble materials.

EXAMPLES 18–26

A series of cleavage reactions was run in the same manner as in Example 17 using 28 g. of cephalosporin C sodium salt monohydrate. The results of these examples are summarized in Table 2. In Examples 18 and 19, 6.3 ml. of nitrosyl chloride was used, while in Examples 20–26, 6.5 ml. of nitrosyl chloride was used. In Examples 20–22 the residue from the evaporation was first dispersed in the inert solvent, then the oxide was added. In the other examples a solution of the oxide in the solvent was added to the residue. In the table the symbol R—$NO_2$ represents a mixture of equal volumes of nitromethane and 2-nitropropane. Ammonium sulfamate was added prior to concentration in all examples. Propylene oxide was the alkylene oxide used in all but Example 26, in which ethylene oxide was used. The product from Examples 18, 19, and 26 was washed with 200 ml. of acetonitrile before drying. The yield figures are corrected to reflect the yield of pure 7-ACA.

TABLE 2

| Example | $HCO_2H$, ml. | Diluent | Ml. | $NH_4SO_3NH_2$, g. | Solvent | Ml. | Alkylene oxide, ml. | Yield, percent |
|---|---|---|---|---|---|---|---|---|
| 18 | 100 | $CH_3CN$ | 200 | 4 | Acetonitrile | 100 | 40 | 49.1 |
| 19 | 70 | R—$NO_2$ | 210 | 4 | ⸺do⸺ | 150 | 35 | 40.0 |
| 20 | 100 | $CH_3CN$ | 200 | 6 | ⸺do⸺ | 300 | 30 | 47.5 |
| 21 | 100 | $CH_3CN$ | 200 | 6 | Dioxane | 300 | 30 | 40.0 |
| 22 | 100 | $CH_3CN$ | 200 | 6 | Dimethylformamide / n-Butyl acetate | 50 / 250 | 30 | 55.4 |
| 23 | 100 | $CH_3CN$ | 200 | 6 | R—$NO_2$ | 250 | 30 | 55.8 |
| 24 | 100 | $CH_3CN$ | 200 | 6 | Acetone | 250 | 30 | 41.5 |
| 25 | 100 | $CH_3CN$ | 200 | 6 | Ethyl acetate | 250 | 30 | 55.2 |
| 26 | 100 | $CH_3CN$ | 200 | 6 | Acetonitrile | 250 | 40 | 53.0 |

Since the objective of my process is the preparation of 7-ACA sufficiently pure that it can be used in the preparation of biologically active derivatives, it is important to determine if the product 7-ACA can be so used. One such use involves the hydrogenation of 7-ACA to 7-aminodesacetoxycephalosporanic acid (7-ADCA). When the 7-ACA from Example 1 was subjected to this hydrogenation 7-ADCA was obtained in 69 percent yield. This yield is comparable to that obtained when the 7-ACA used in the hydrogenation has been purified by conversion to the p-toluenesulfonic acid salt as described in British Pat.

1,104,938. The hydrogenation proceeded smoothly and there were no adverse side reactions.

Many active antiobiotic substances are obtained by the acylation of the 7-amino group of 7-ACA. The introduction of a phenylglycyl group at this position of 7-ACA from Example 1 proceeded in a 60 percent yield. Again, this is comparable to the yield obtained when a purified 7-ACA is used. The reaction proceeded smoothly. In addition, the 7-ACA from Example 3 was acylated with thiophene-2-acetyl chloride following the procedure of U.S. Pat. 3,351,597 using acetone and urea. The acylation proceeded smoothly and cephlothin was obtained in good yield and purity.

As a further determination of purity the nuclear magnetic resonance spectra of 7-ACA precipitated with ethylene oxide and propylene oxide were compared with the spectrum of 7-ACA purified by means of the p-toluenesulfonic acid salt. The spectra were superimposable with no new protons observed. In addition to showing the purity of the 7-ACA, this confirms that there was no reaction of the oxide with the 7-ACA.

I claim:
1. In a process for the preparation of 7-aminocephalosporanic acid by contacting a cephalosporin compound selected from the class consisting of cephalosporin C and salts thereof with a reagent selected from the class consisting of nitrosating agents, carbocyclic arenediazonium salts, and substances affording positive halogen, at a temperature of less than about 60° C., whereby an intermediate is obtained, treating the intermediate with a member of the class consisting of water, lower alkanols containing one to three carbon atoms, and mixtures thereof, and precipitating the 7-aminocephalosporanic acid from solution, the improvement which comprises adding a lower alkylene oxide containing two to four carbon atoms to the solution to precipitate the 7-aminocephalosporanic acid.

2. A process as in claim 1 wherein the reagent is nitrosyl chloride.

3. A process as in claim 1 wherein the lower alkylene oxide is selected from the class consisting of ethylene oxide and 1,2-propylene oxide.

4. A process as in claim 1 wherein the intermediate is treated with methanol.

5. A process as in claim 1 wherein the reaction of the cephalosporin compound with the reagent is conducted in a mixed solvent system comprising formic acid and a member of the class consisting of nitromethane, acetonitrile, and maxtures of nitromethane and 2-nitropropane.

6. A process for the production of 7-aminocephalosporanic acid which comprises treating a solution of cephalosporin C sodium salt monohydrate in a mixture of formic acid and acetonitrile with from 2 to 2.5 moles of nitrosyl chloride at a temperature within the range of −10° C. to +5° C., pouring the reaction mixture into methanol, and adding propylene oxide to precipitate the product 7-aminocephalosporanic acid.

7. In a process for the preparation of 7-aminocephalosporanic acid by the treatment of a cephalosporin compound selected from the class consisting of cephalosporin C and salts thereof with a reagent selected from the class consisting of nitrosating agents, carboxylic arenediazonium salts, and substrates affording positive halogen, at a temperature of less than about 60° C. in a solvent, evaporating the solvent to leave a residue, and recovering the 7-aminocephalosporanic acid from the residue, the improvement which comprises treating the residue with a lower alkylene oxide containing from two to four carbon atoms to separate the 7-aminocephalosporanic acid therefrom.

8. A method as in claim 7 wherein the solvent is a mixture of formic acid and acetonitrile.

9. A method as in claim 7 wherein the reagent is nitrosyl chloride.

10. A method as in claim 7 wherein the lower alkylene oxide is selected from the class consisting of ethylene oxide and 1,2-propylene oxide.

11. A method as in claim 10 wherein the solvent is a mixture of formic acid and acetonitrile.

12. A method as in claim 11 wherein the reagent is nitrosyl chloride.

13. A method as in claim 7 wherein the alkylene oxide is added in solution in acetonitrile.

References Cited
UNITED STATES PATENTS

| | | | |
|---|---|---|---|
| 3,367,933 | 2/1968 | Eardley et al. | 260—243C |
| 3,507,862 | 4/1970 | Stamper et al. | 260—243C |

NICHOLAS S. RIZZO, Primary Examiner

UNITED STATES PATENT OFFICE
CERTIFICATE OF CORRECTION

Patent No. 3,594,371          Dated July 20, 1971

Inventor(s) Thomas W. McIntyre

It is certified that error appears in the above-identified patent and that said Letters Patent are hereby corrected as shown below:

In column 2, line 8, "view" should read --yield--.

In column 6, line 28, "43.2" should read --53.2--

In column 8, line 3, "maxtures" should read --mixtures--.

In column 8, line 17, "substrates" should read --substances--.

Signed and sealed this 29th day of February 1972.

(SEAL)
Attest:

EDWARD M. FLETCHER, JR.          ROBERT GOTTSCHALK
Attesting Officer                Commissioner of Patents